United States Patent [19]

Dadi et al.

[11] Patent Number: 4,602,550
[45] Date of Patent: Jul. 29, 1986

[54] RULER FOR COMPOSING OR DECOMPOSING THE CHORDS FOR ANY POLYPHONIC MUSICAL INSTRUMENT

[76] Inventors: Max M. Dadi; Marcel Dadi, both of 23 rue Jean Jaguin, F-94000 Creteil, France

[21] Appl. No.: 517,525
[22] PCT Filed: Nov. 12, 1982
[86] PCT No.: PCT/FR82/00185
§ 371 Date: Jul. 18, 1983
§ 102(e) Date: Jul. 18, 1983
[87] PCT Pub. No.: WO83/01856
PCT Pub. Date: May 26, 1983

[30] Foreign Application Priority Data
Nov. 16, 1981 [FR] France .................. 81 21394

[51] Int. Cl.$^4$ ............................................. G09B 15/02
[52] U.S. Cl. .................. 84/473; 84/485 SR; 84/480
[58] Field of Search ............ 84/471 SR, 473, 480, 84/474, 485 SR

[56] References Cited

U.S. PATENT DOCUMENTS

| | | | |
|---|---|---|---|
| 2,832,252 | 4/1958 | Gabriel | 84/480 |
| 3,481,241 | 12/1969 | Gaillard | 84/474 |
| 4,175,468 | 11/1979 | Whitlock | 84/485 SR |
| 4,289,057 | 9/1981 | Whitlock | 84/485 SR |

Primary Examiner—Benjamin R. Fuller
Attorney, Agent, or Firm—Louis Orenbuch

[57] ABSTRACT

The ruler for composing or decomposing the chords for polyphonic musical instruments is characterized in that it comprises: ruler slides (A,B,C,D,E,F,P,Q) movable with respect to each other in a given direction and each provided with inscriptions relative to the notes of the chromatic scale, respectively assigned to the fundamental, the third, the fifth, the sixth, the seven the etc. ... of chord—a cursor (K,N) relatively movable in said given direction with respect to the ruler slides, said cursor being with a marking (L,N5) positioned to make evident one of the notes of the chromatic scale of each of the slides: one element (H) integral with the slide (A,P) assigned to evident the inscriptions relative to the musical chord searched for the invention applies to a chord ruler for polyphonic musical instrument.

9 Claims, 16 Drawing Figures

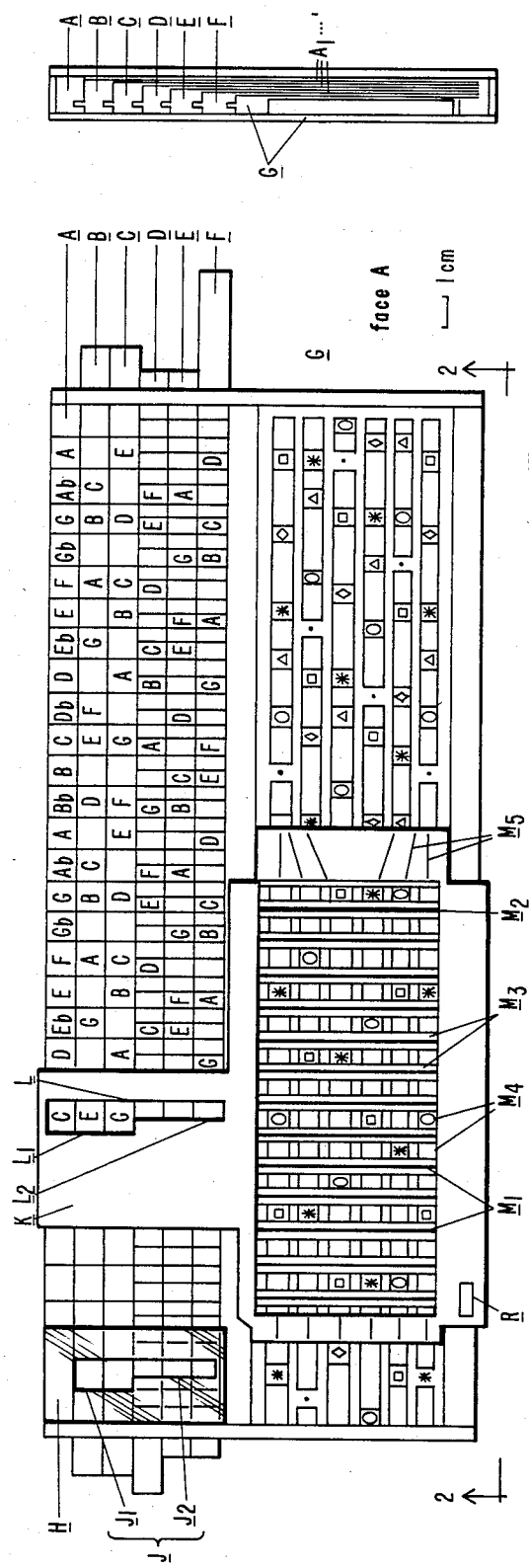
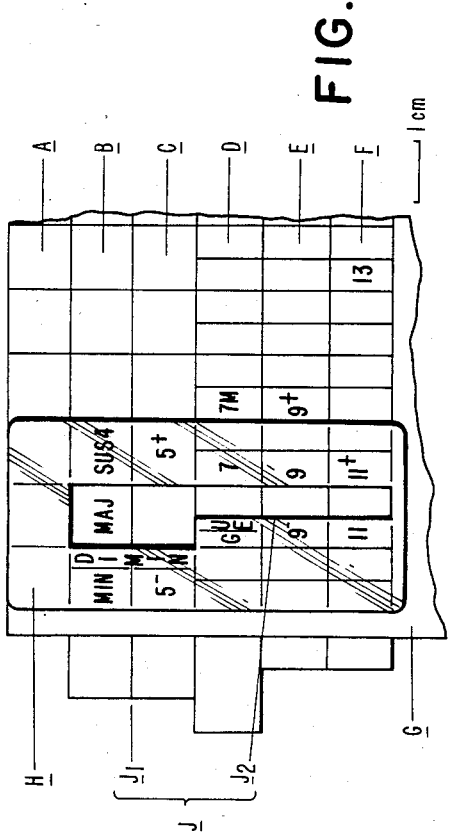
FIG. 1a  FIG. 1b  FIG. 1c

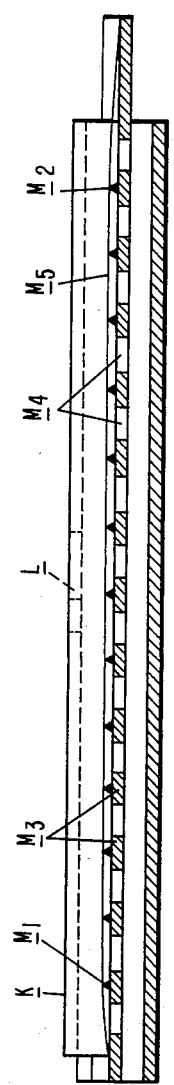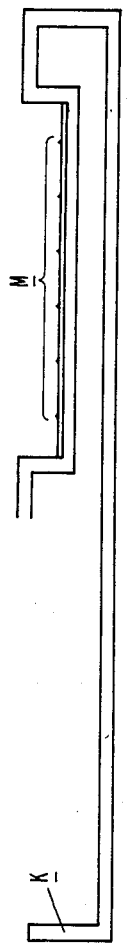

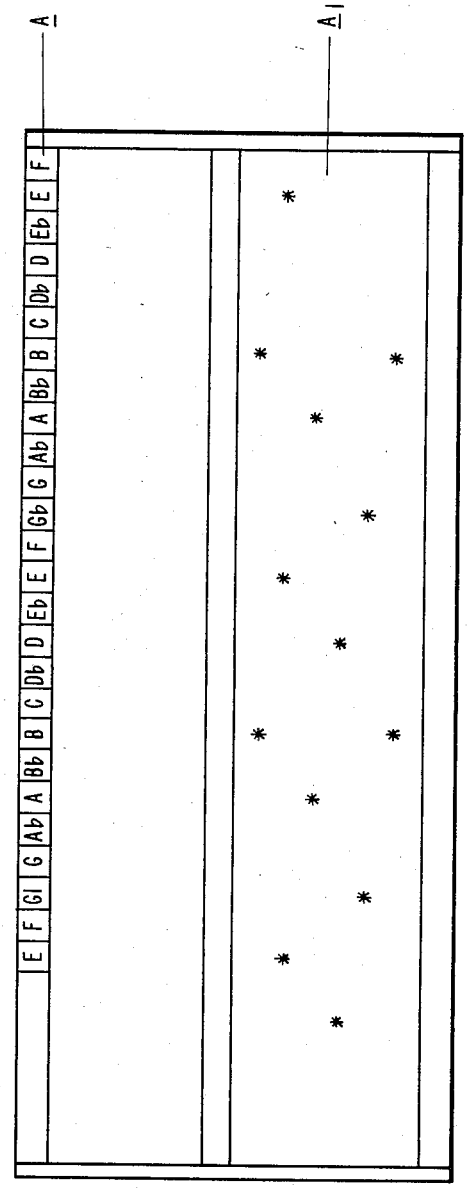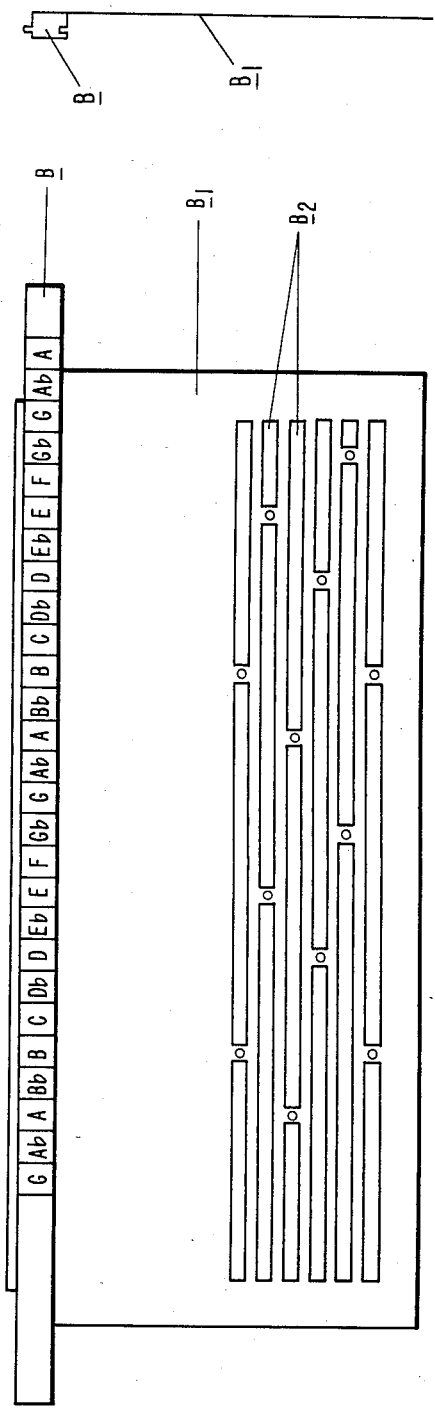

RULER FOR COMPOSING OR DECOMPOSING THE CHORDS FOR ANY POLYPHONIC MUSICAL INSTRUMENT

The invention relates to a ruler for composing or decomposing the chords for any polyphonic musical instrument.

In conventional chord rulers, the chord is treated as a whole: on a first level there are the fixed elements, in other words, the name of the chord accompanied by a window for the fundamental and followed by a number of windows equal to the number of notes which go to make up the chord and separated from one another by intervals which are characteristic of the chord; on a second movable level is the chromatic scale for the display of the notes in the windows.

That arrangement can be used for any first degree function and is widely used for conversion tables.

The major drawback of such rulers is that it is essential to have them show the complete catalogue of chords which makes them difficult and tiresome to use. All those rulers are therefore incomplete and selective in order to remain legible.

It is a particular object of the invention to remedy the deficiencies of prior chord rulers and to this end the invention resides in a ruler for composing or decomposing chords for a polyphonic musical instrument characterised in that it comprises:

ruler slides movable with respect to each other in a given direction and each provided with inscriptions relative to the notes of the chromatic scale, respectively assigned to the fundamental, the third, the fifth, the sixth, the seventh etc. of a chord, a cursor, relatively movable in said given direction with respect to the ruler slides, said cursor being provided with a window positioned to make evident one of the notes of the chromatic scale of each of the slides, an indicator element integral with the slide assigned to the fundamental and having a window positioned to make evident the inscriptions relative to the musical chord searched for, these inscriptions being carried on all the ruler slides except that which is rigid with the said element, the inscriptions on the ruler slides relative to the chromatic scale, and their inscriptions relative to the musical chords being positioned in relation to one another and in relation to the window in the cursor and the window in the indicator element in such a way that for a chord displayed in the window of the indicator element, the window in the cursor makes evident the notes of this chord for the fundamental chosen.

According to another characteristic of the invention, the windows in the indicator element and in the cursor each comprise two zones, the width of one of the zones being twice that of the other, the wider zone of the window in the cursor being displaced in relation to the three ruler slides allocated respectively to the fundamental, the third and the fifth of a chord, the wider zone of the window in the indicator element for displaying the chord moving in relation to the two ruler slides allocated to the third and the fifth, the less wide zones of the window in the indicator element and in the cursor moving in relation to all the remaining ruler slides as a whole which are allocated to the sixth, seventh, ninth etc.

According to a further feature of the invention, the window in the indicator element and in the cursor is made in the form of a slot at right angles to the direction of movement of the cursor and of the ruler slides.

According to a further feature of the invention, the element which is provided with the slot is made from transparent material and the subjacent ruler slides are provided, on each side of the position of the common major chord, with inscriptions relative to variations thereof, these inscriptions being visible through the transparent element.

According to a further feature of the invention, the ruler slides are provided with transverse divisions which define boxes, the boxes of the three ruler slides allocated respectively to the fundamental, the third and the fifth of a chord each comprising one note of the chromatic scale and being twice the width of the boxes of the remaining ruler slides which are allocated respectively to the sixth, seventh, ninth etc., the boxes for these remaining ruler slides having an empty box between each of the boxes in which there is a note.

According to another feature of the invention, the ruler slides are each integral with a sheet, the different sheets being superposed while the cursor comprises a representation of the control part of a musical instrument, such as the neck of a guitar or a piano keyboard situated above the sheets, this representation having windows in the regions where the fingers are positioned, the sheets having markings for the finger positions corresponding to the notes of the chord displayed in the window of the cursor, and the sheets having apertures permitting the finger position markings on the subjacent sheets to be seen in the windows of the representation.

By way of non-limitative example, the invention is illustrated on the appended drawings, in which:

FIG. 1a is a top plan view of the obverse face of the ruler,

FIG. 1b is an end elevation of FIG. 1a,

FIG. 1c is an enlarged view of part of the structure depicted in FIG. 1a,

FIG. 2 is a view in elevation taken along the plane 2—2 of FIG. 1a,

FIG. 5 is an enlarged plan view of the cursor of FIG. 1a,

FIG. 6 is a section in elevation taken along the plane B—B' of FIG. 5,

FIG. 7 is a section in elevation taken on the plane A—A' of FIG. 5,

Figure 8:
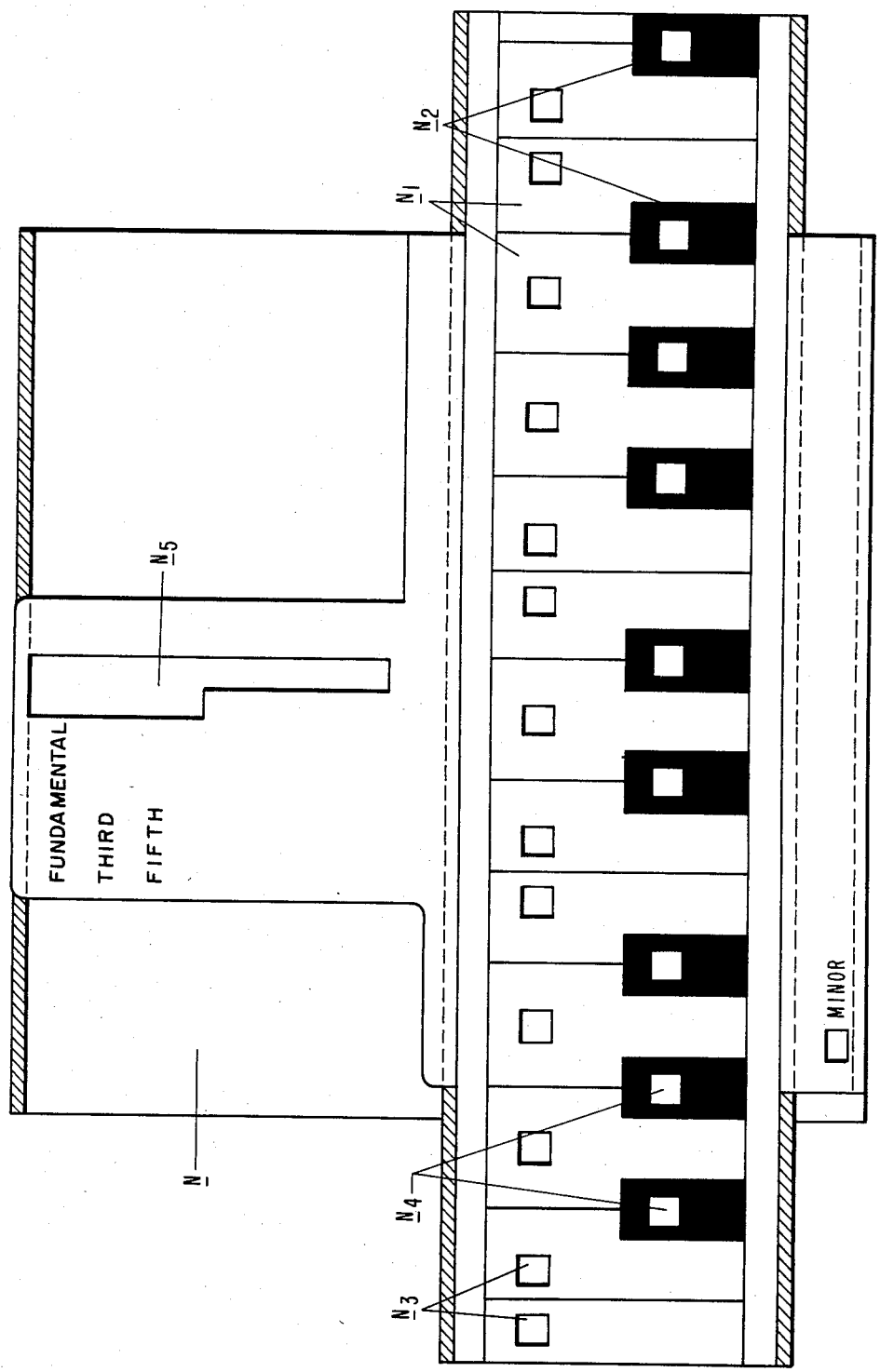
Figure 11:
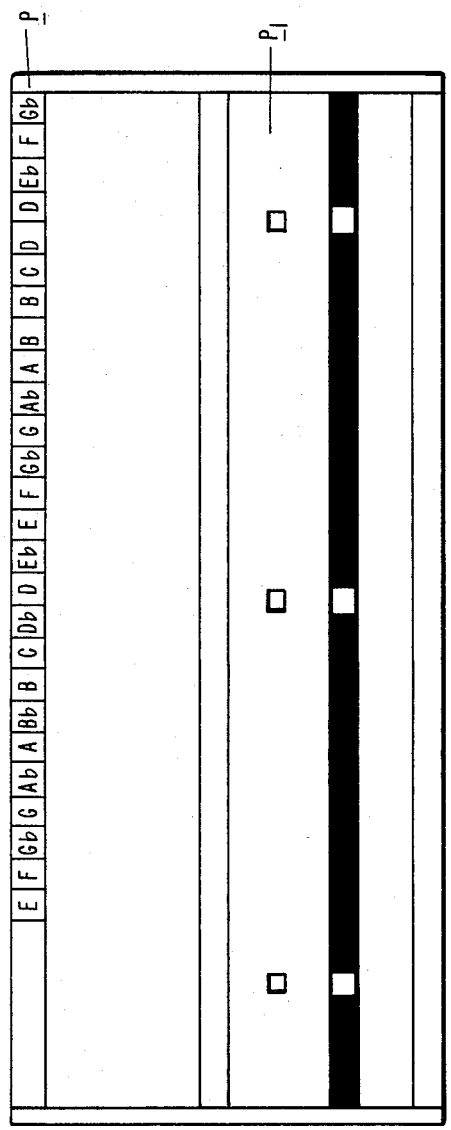
Figure 12:
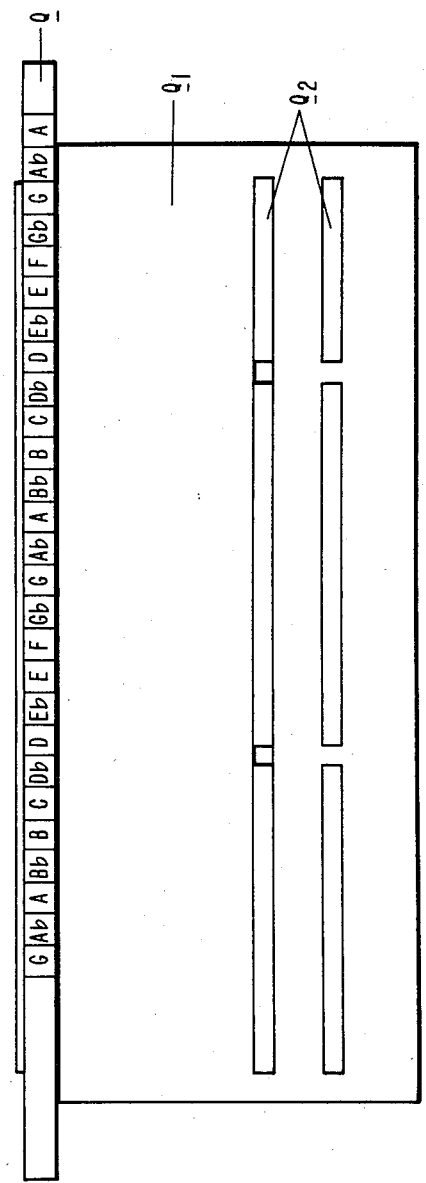

FIG. 8 is a top plan view of the cursor for one embodiment of the ruler for a keyboard instrument, FIG. 9 is a top plan view showing the rigid frame for supporting the other elements of FIG. 1a, FIG. 9a is an end elevation of FIG. 9, FIG. 10 is an elevational view of one of the movable ruler slides of the ruler in FIG. 1a, FIG. 10a is an end view of FIG. 10, FIGS. 11 and 12 are elevational views of the two ruler slides employed with the cursor in FIG. 8 for application of the ruler to keyboard instruments.

In order the better to understand the construction of the ruler according to the invention, it must be recalled that:

a common chord comprises the same first three notes plus the sixth, a sixth chord comprises the same first three notes plus the sixth, a seventh chord or major seventh still comprises the same first three notes plus the seventh or the major seventh, when a chord is a ninth, minor ninth or major ninth, it is also already seventh, when a chord is eleventh or eleventh major, it is also already ninth and seventh, when a chord is thirteenth, it is also already eleventh, ninth and seventh, when a chord is fifteenth, it is also already thirteenth, eleventh, ninth and seventh, when in the naming of a chord, there is no stipulation as to minor or above 4, it is understood to be major, when a chord is diminished, the third, the fifth and the seventh drop one semitone.

In order to avoid any confusion with the letters and figures carried on the ruler itself, the references to the drawings appended to the present description shall consist of underlined capital letters.

Likewise, whenever in the present description the term "chromatic scale" is used, it is understood that all the notes in the scale are inscribed in the order of the scale.

Figure 2:
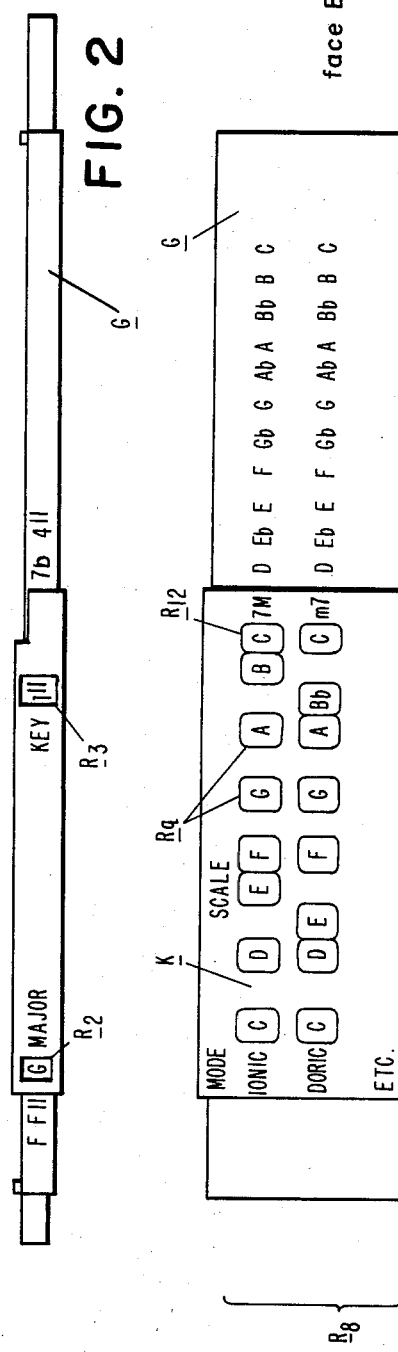
Figure 3:
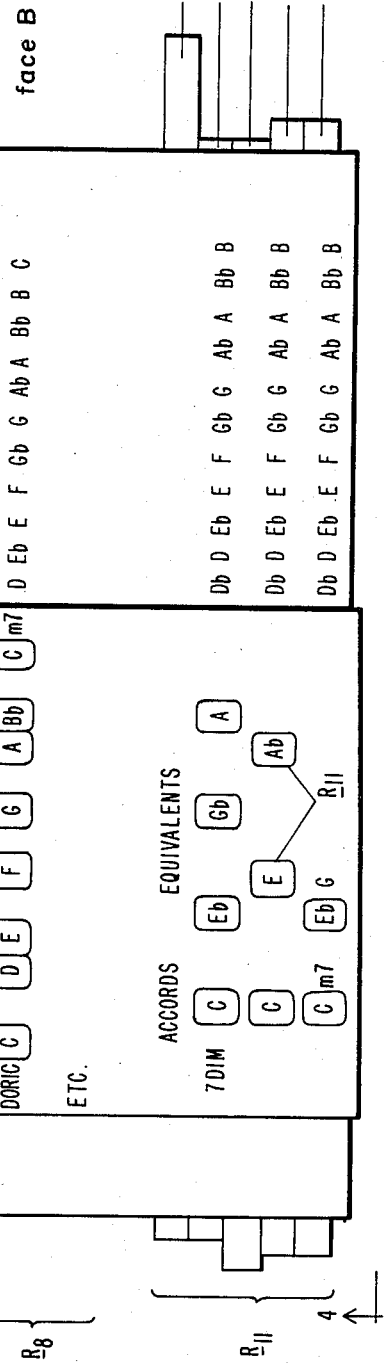
FIG. 3 is a top plan view of the reverse face of the ruler.
Figure 4:
FIG. 4 is a side view in elevation taken along plane 4—4 in FIG. 3.

The ruler consists of three parts:

the first part, by displaying the name of a given chord, makes it possible to read by means of a cursor, the notes of which the chord is composed (see in particular FIG. 1a, upper half), the second part automatically displays the position of the fingers on the instrument for the notes displayed by the cursor (see particularly FIG. 1a, lower half), the third part displays the scales of improvisation with effect from the fundamental chosen on the cursor, the chords which are equivalent to one another, the tonality of the score from the key signature and also the international way of writing the notes (see FIGS. 2, 3 and 4).

In the embodiment of the invention made for the guitar, as shown in FIGS. 1a to 7 and 9 to 10a, the first part consists of six ruler slides of equal width (1 cm. in the example illustrated) designated A, B, C, D, E, F. The first slide A is fixed in position as part of the support frame G. The B, C, D, E, and F slides are arranged to slide in the frame and, as shown in FIG. 1b, each slide has a groove in which is received the tongue of the adjacent slide. The immovable slide A has an affixed indicator element H which extends over a portion of each of those movable slides. The indicator element H is transparent and provided with a window J permitting display in the window of the chord sought after by markings on the ruler slides B, C, D, E, F.

This window has two zones J1 and J2, zone J1 extending over the ruler slides B and C and being twice the width of the zone J2 which extends over the ruler slides D, E, and F.

In the example illustrated, the window is one centimeter wide in the region of the ruler slides B and C and 0.5 centimeter wide in the region of ruler slides D, E and F.

The ruler slides A, B, C are divided transversely by reference lines (see FIG. 1a) defining a series of boxes which, in the example shown, are of a width equal to one centimeter.

On the other hand, ruler slides D, E and F are divided transversely by reference lines defining a series of boxes, the width of which is equal to 0.5 centimeter.

In the present description, the term "box" is understood to mean a zone bounded by transverse reference lines which may be real or imaginary.

In order to properly situate the inscriptions carried in the boxes on the ruler slides with respect to the position of the the window in the indicator element H attached to the immovable slide A, the arrangement arbitrarily adopted is a basic position which is the major common chord.

In this basic position, the symbol "MAJ" on slide B which means major is centered in the window J, while the boxes on ruler slides C, D, E and F which appear in the window J are empty and coloured (grey for example) so that they can be recognised.

On the box in ruler slide B which precedes the symbol "MAJ", there is printed the symbol "MIN" which means minor and on the box which follows is the symbol "SUS4" (above 4).

On the ruler slide C, the grey box is preceded by the symbol "5−" which means diminished fifth, and is followed by the symbol "5+" which means augmented fifth.

On the ruler slide D, the grey box is preceded by the symbol "6" and is followed by the symbol "7", then after an empty box, by the symbol "7M" which means major seventh.

On the ruler slide E, the grey box is preceded by the symbol "9−" (diminished ninth) and followed by the symbol "9" then after an empty box by the symbol "9+" (augmented ninth).

On the ruler slide F, the grey box is preceded by the symbol "11" and is followed by the symbol "11+" (augmented eleventh), then after five empty boxes, by the symbol "13".

The diminished chords are obtained by displaying the positions "MIN", "5−", "6", and so that they can the better be recognised, the word "DIMINISHED" is printed vertically astride these three boxes which appear in the window J.

Printed on the other boxes on the ruler slides are, in order from left to right the notes of the chromatic scale DO, REb, MIb, MI, FA, SOLb, SOL, LAb, LA, TIB, TI, DO without leaving any empty box for the ruler slides A, B, C and leaving an empty box between each note on ruler slides D, E and F.

Chromatic scales are made up in the boxes of the six ruler slides and positioned inter se in such a way that when for example the chord "11" is displayed in the window J (that is to say: "MAJ", "7", "9", "11") and therefore when, through this window J, "MAJ" appears from ruler slide B, the grey box appears from ruler slide C, "7" appears from the ruler slide D, "9" from the ruler slide E and "11" from the ruler slide F. In this case, there are displayed at the height of the DO on immovable slide A, the MI of ruler slide B, the SOL of ruler slide C, the SIb of ruler slide D opposite the right hand half of the box which marks the SOL on ruler slide C, RE on the ruler slide E under SIb and FA on F under RE (see FIG. 1a).

The cursor K also comprises a mask that extends across slides A, B, C, D, E and F and is provided with a window L which, like the window J, is divided into two zones L1 and L2. Zone L1 extends across the ruler slides A, B and C and is of twice the width (one centimeter) of the zone L2 which extends across the ruler slides D, E and F.

In conjunction with the mask and the window L of the cursor K the fixed ruler slide A gives the fundamental, the ruler slide B gives the third, and the ruler slide C gives the fifth.

By displaying the fundamental chord in the window L of the cursor K, it is possible therefore to read underneath the notes which compose the chord displayed in the window J.

Thus, the chord is progressively constructed on the basis of its simple name, note by note. This, therefore, offers a twofold advantage: first of all, the advantage of convenience of use by virtue of legibility and the ability to break down all chords without restriction, and secondly a teaching advantage since the significance of the name of a chord is understood, along with the manner in which it is possible to pass from one to another.

According to the embodiment described and shown in the drawings, by way of simplification these show on the same ruler slide D the "6" and the "7", which makes it possible to display chords 7/6. In fact, it is sufficient to know that the "13" and the "6" represent the same note on the octave in order to replace the display 7/6 by 7/13.

Moreover, on the guitar, it is only possible to play six notes at a time (six strings), which means that one can only fully play chords up to the eleventh (altered or not altered). For "13" chords which in fact comprise seven notes, the eleventh is normally dispensed with: this is why the "13" appears on the same ruler slide as the "11". "15" chords are not used on the guitar.

Therefore, purely at sol-fa level, it would in fact be necessary to have nine ruler slides (one for the fundamental, one for the third, one for the fifth, one for the sixth, one for the seventh, one for the ninth, one for the eleventh, one for the thirteenth and one for the fifteenth): this would be useful for the piano for example or for the guitar when voluntarily truncated chords are involved.

The second part of the ruler resides in the display of the position of the fingers on the instrument (a guitar in the embodiment shown in FIG. 1a) according to the notes displayed on the window of the cursor. Each ruler slide A, B, C, D, E and F (see FIGS. 1a and 1b) carries a thin rigid sheet A1, B1, C1 ... F1 which may consist of plastics material or metal. These six sheets are superposed in such a way that the sheet A1, rigid with the immovable slide A, is fixed in the same way as this ruler slide and is rigid with the frame G of the ruler of which it thus constitutes the bottom level. Superimposed thereon in sequence are sheets B1 of B, C1 of C, D1 of D, E1 of E and F1 of F.

The ruler slides decrease in thickness from A to F so that the front face of the ruler slides is on one and the same level.

Figure 5:
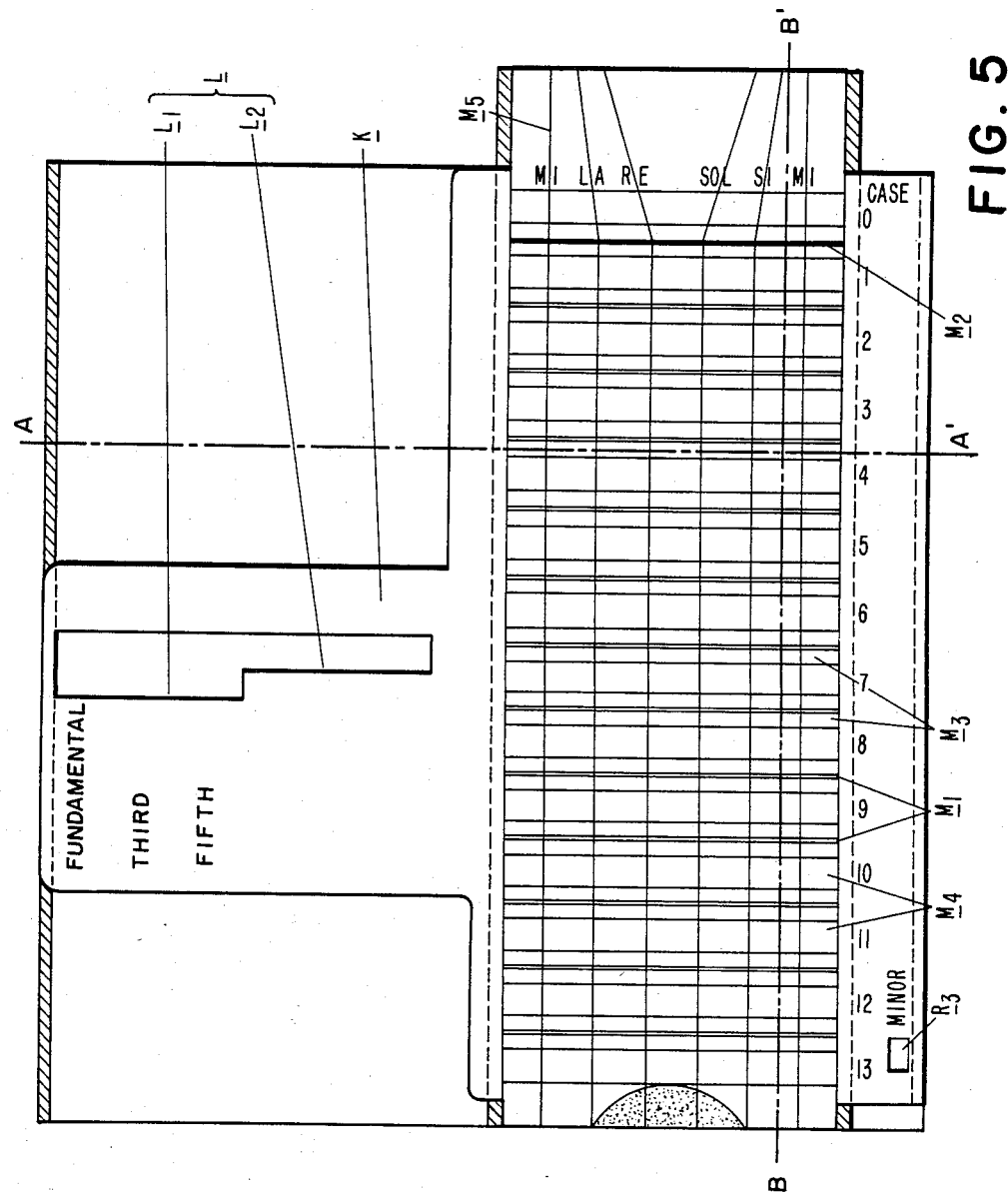

The lower half of the anterior face of cursor K represents at M the front face of the neck of the guitar, the head being on the right (FIG. 5).

Each fret M1 of the neck is at right angles to the ruler slides and is separated from its neighbour by a gap of 1 centimeter.

Over 2.5 millimeters on either side of each fret M1 and of the nut M2 the cursor is opaque at M3. Between these opaque zones M3, the cursor is transparent or forms windows M4 (FIGS. 5 and 6) which make it possible to read on the sheets A1, B1, C1, D1, E1, F1.

Drawn on the frets M1 and the nut M2 are the six strings M5 of the guitar, the sixth at the top being the MIb string, then, going down: LA, RE, SOL, TI, MI (first string).

The boxes between the frets M1 are numbered from right to left from 0 to 13, the 0 being the string played open (FIG. 5).

Printed on sheet A1 (see FIGS. 9 and 9a), opposite windows M4 between frets M3 are all the positions of the fingers on the guitar which make it possible to obtain the fundamental note displayed in the top of the window L of the cursor K, these positions being represented by the symbol "*".

Thus, for example, for the note SOL displayed by the cursor on the immovable slide A (see FIG. 1a) there appear on the representation of the guitar, between frets M1 the symbols "*" for the following positions:

6th string box 3
5th string box 10
4th string box 5
3rd string box 0
2nd string box 8
1st string box 3

It will be perceived that if the cursor is moved from left to right by one semitone, that is to say one box (1 centimeter), the cursor displays LAb and all the symbols "*" have been moved relatively from right to left by one box on the guitar: the LAb is thus obtained by playing the following notes:

6th string box 4
5th string box 11
4th string box 6
3rd string box 1
2nd string box 9
1st string box 4

Therefore, every movement of the cursor is accompanied by a relative reverse movement and equivalent amplitude movement of the symbol representing the note to be played.

Likewise for the sheet B1 (see FIGS. 10 and 10a) the symbol "0" is printed at the positions for the fingers which correspond to the note (third) displayed by the ruler slide B through the window L of the cursor K.

Between the symbols "0", the sheet is perforated according to top slots B2 of 0.5 centimeter aligned, assuming a position at the height of the figuring of strings M5 drawn on the cursor. The slots B2 make it possible to reveal the symbols "*" of the level below.

The same procedure is adopted for the other sheets:
the symbol "□" is used for sheet C1
the symbol "◇" is used for sheet D1
the symbol "Δ" is used for sheet E1
the symbol "*" is used for sheet F1.

For sheets D1, E1 and F1, when no note is displayed in the window L of the cursor K (a clear space between two notes on the ruler slides D, E and F), no symbol appears at the height of the representation M of the guitar; they are indeed concealed by opaque zones M3.

Thus, for every chord sought, the cursor K makes it possible simultaneously to give the name of the notes of which it is composed and all the positions of the fingers on the instrument needed to obtain this chord. The choice of the position and the manner of placing the fingers is only a question of technique which is acquired very quickly with a little practice.

The characteristic features of the invention may be exploited in order to provide rulers which can be used for composing chords with the help of widely diverse musical instruments.

According to FIGS. 8, 11 and 12 there is thus illustrated a ruler which is applicable to the piano, organ, or any keyboard instrument.

In this case, the cursor N (FIG. 8) is modified in its lower part to represent a keyboard in reverse. Indeed, on a keyboard, one goes from flat to sharp as one plays from left to right. The symbols of the notes on the sheets P1, Q1 of ruler slides P, Q move from right to left when sharper notes are displayed on the cursor N. To co-ordinate the movements, two possibilities are therefore available, either to turn the keyboard round and retain the direction of writing of chromatic scales on the ruler slides or conversely to keep the keyboard right way round and reverse the direction of writing the chromatic scales on the ruler slides.

Every white key N1 or black key N2 is perforated with a square measuring 5 mm×5 mm, respectively N3, N4 to allow visualisation of the notes to be played.

The width of the keys is modified so that the gap between two keys is a function of the gap between two notes on the ruler slides.

Shown on the sheet P1 (see FIG. 11) of the ruler slide P, are the positions of the fundamental note of the ruler slide P displayed at the top of the window N5 of the cursor. Each note appears on two superposed levels on the two sheets P1, Q1, one for the white keys, one for the black keys. On the first level, the notes appear in black on a white background while on a lower level the notes appear in white on a black background.

Thus, when a white key must not be played, the window of the cursor remains white and when it must be played, it appears black and conversely for the black keys.

The same procedure is adopted on the sheet Q1 (see FIG. 12) of the ruler slide. As for the sheets provided for the guitar, the gap between two notes is formed by a slot Q2 to allow reading of the notes on lower levels.

The same procedure is adopted for all the ruler slides.

By simplification, no distinction is made in FIGS. 11 and 12 between notes in order to differentiate between them. Indeed, whatever the instrument, in practice, the difference may be marked by a set of different colours, the same colour being given to the ruler slide and to the note which appears on the corresponding sheet.

To date, the best way of representing the positions of fingers for playing a chord on an instrument resided in illustrating each chord on a different illustration of the instrument, which is not practical in use due to the considerable number of chords which exist.

The interest of the present invention lies in the fact that the same drawing of the instrument (here the cursor) makes it possible to visualise all the chords very legibly and makes it possible to visualise on the instrument all the notes which are displayed on the cursor: that is to say one can likewise display on the upper half of the cursor one given scale, visualise it on the instrument and by means of movement of the cursor, transpose this scale into another tonality.

There is also an interest for the beginner who can display in the order from top to bottom on the cursor those notes of the score which he must learn to play and see on the instrument illustrated on the cursor in what position he must place his fingers in order to play the piece.

The third part of the ruler will be explained in conjunction with FIGS. 2, 3 and 4 which relate to the ruler applied to the guitar illustrated furthermore by drawings 1a, 1b, 1c, 5, 6, 7, 9 and 10. This third part consists of:

(1) The upper field of the ruler (FIG. 4) which, by means of a window R on the cursor K makes it possible to convert the note displayed on the ruler slide A which is rigid with the support structure G in its internationally written form.

(2) The lower field (FIG. 2) which makes it possible, by display on the window R1, to the right of the key signature to a score, to know by means of another window R2 on the left in which major tonality one is playing and by means of the window R3 which is in the bottom left hand part of the upper face, in which equivalent minor key one is playing.

(3) The rear face (see FIG. 3) provides two types of information:
(a) on the one hand, the different improvisation scales used (zones R8) by bringing into line a row of windows R9 to correspond to the notes carried on the support structure G,
(b) on the other, the table (zone R10) of chords which are equivalent inter se by means of windows R11 disposed in the bottom part of the rear face of the cursor K.

The table of improvisation scales is composed on the one hand of the list of the various modes disposed on the left from the top downwards on the cursor (see FIG. 3) and on the other, opposite each mode, from left to right, windows disposed according to intervals which are characteristic of this mode.

On the right hand part of the table opposite each row of windows R9 indicating the scale of improvisation is the name of the chord which corresponds to this scale of improvisation, preceded by a window R12 indicating the fundamental of this chord.

The rear face of the support structure G is entirely covered by the repetition of the chromatic scale, from left to right, on each row opposite windows R9, R11 and R12 of the cursor. Thus, the cursor makes it possible by a sliding movement to read the notes which compose the ranges of improvisation and the change in tonality. In the embodiment described, each note of the chromatic scale is one centimeter away from the note which precedes it or that which follows it.

This ruler therefore makes it possible rapidly to provide a considerable number of items of useful musical information of advantage both to the beginner and to the professional and its scope is international since musical language is universal.

In the examples hereinabove, the ruler slides A or P is integral with the frame G on which slides the cursor K or N. In a different embodiment, however it would be possible for the ruler slide A or P to be made movable on the support structure, in which case the cursor would be rigid with the said support structure.

Likewise, rulers for composing and decomposing the chords as described are constituted by rulers in which the movable elements move lineally by sliding. However, it is possible to envisage similar rulers in which displacements are circular. In this case, the ruler slides and their sheets would consist of discs mounted co-axially for rotation on a spindle of a circular support, said spindle carrying a rotary slider or cursor element. In this case, the discs constituting the ruler slides will be of different diameters, the discs stacked being successively smaller, this difference of diameter revealing at the periphery of each disc an annular zone or ruler slide bearing the inscriptions of the chromatic scales and the elements of the chord, while the zones of these discs which cover one another will constitute the sheets and will be provided with corresponding markings or inscriptions.

We claim:

1. A ruler for composing or decomposing chords for a polyphonic musical instrument, comprising:
    (i) a plurality of ruler slides disposed side by side, at least all those slides but one being individually movable with respect to the others and all the plurality of slides bearing symbols representing notes of the chromatic scale, one of those ruler slides carrying the note symbols for the fundamental of the chords, the adjacent ruler slide carrying the note symbols for the third of the chords, the next adjacent ruler slide carrying the note symbols for the fifth of the chords, and each successively adjacent ruler slide carrying the note symbols for the sixth, seventh, etc., of the chords, respectively,
    (ii) a cursor mounted to move along the, plurality of slides, the cursor having a window in which one of the note symbols on each of the slides can simultaneously appear,
    (iii) an indicator element fixed to the slide which carries the note symbols representing the fundamental of the chords, the indicator element having an elongate window extending over the other slides, each of those other slides having markings situated to register one at a time with the window by moving the slide, the markings representing the common major chord and variations thereof, and the note symbols being arranged on the slides such that for a chord displayed in the window of the indicator element, the notes of the chord appear in the window of the cursor.

2. The ruler according to claim 1, wherein the window in the indicator element and the window in the cursor each has two zones, the width of one of the zones being twice that of the other zone, the wider zone of the cursor's window extending over the three ruler slides allocated respectively to the fundamental, the third and the fifth of the chords, the wider zone of the window of the indicator element extending over the two ruler slides allocated to the third and fifth, the narrower zones of both windows extending over the ruler slide allocated to the sixth, seventh, etc., of the chords.

3. The ruler according to claim 2, wherein the window of the indicator element and the window of the cursor are slots extending perpendicularly to the direction of the movement of the cursor and of the ruler slides.

4. The ruler according to claim 3, wherein the window of the indicator element has transparent panels enabling the subjacent ruler markings on each side of the symbol representing the common major chord to be visible when the common major chord symbol is centered in the window.

5. The ruler according to claim 2, wherein each of the ruler slides is divided into a series of boxes, the boxes of the three ruler slides allocated to the fundamental, the third, and the fifth of the chords each having in it one note of the chromatic scale and those boxes being twice the width of the boxes of the other ruler slides, each box of those other ruler slides accommodating a single note and there being an empty box between the boxes in which there are notes.

6. The ruler according to claim 1, wherein each ruler slide carries a sheet, the sheets being disposed one over the other, the cursor having an extension representing the control part of a musical instrument, such as the neck of a guitar or a piano keyboard, the cursor's extension overlying the sheets and the extension having windows in it corresponding to finger positions, the sheets having markings corresponding to the finger positions on the instrument for the chord notes displayed in the window of the cursor, and each of the superposed sheets having apertures permitting the finger position markings of the subjacent sheet to be visible.

7. The ruler according to claim 6 wherein the finger position markings on each sheet are distinctively different from the finger position markings on the other sheets.

8. The ruler according to claim 1, further including:
    (iv) a rigid frame having immovably affixed to it the indicator element and the ruler slide allocated to the fundamental of the chords.

9. The ruler according to claim 6 wherein the symbols for the notes of the chromatic scale, the symbols for the common major chord and its variations, and the finger position markings appear on the obverse face of the ruler, the reverse face of the ruler having inscriptions on it relating to the scales of improvisation of the various modes.

* * * * *